(12) United States Patent
Freeman et al.

(10) Patent No.: US 6,379,486 B1
(45) Date of Patent: Apr. 30, 2002

(54) PROCESS FOR SEAMING INTERLOCKING SEAMS OF POLYIMIDE COMPONENT USING POLYIMIDE ADHESIVE

(75) Inventors: T. Edwin Freeman, Webster; Joseph A. Swift, Ontario; Santokh S. Badesha, Pittsford; Xiaoying Elizabeth Yuan, Fairport; Edward L. Schlueter, Jr., Rochester; Nancy Y. Jia, Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/615,444

(22) Filed: Jul. 13, 2000

(51) Int. Cl.⁷ .............................. B65G 15/30; F16G 1/00

(52) U.S. Cl. ...................... 156/137; 156/218; 156/258; 156/304.5; 156/331.8

(58) Field of Search .................................. 156/137, 218, 156/258, 266, 304.1, 304.5, 308.4, 331.8

(56) References Cited

U.S. PATENT DOCUMENTS

| | | | | |
|---|---|---|---|---|
| 4,403,632 A | | 9/1983 | Romanski | 139/383 |
| 4,859,530 A | * | 8/1989 | Roark et al. | 428/294 |
| 5,063,125 A | * | 11/1991 | Yuh et al. | 430/59 |
| 5,119,147 A | | 6/1992 | Hays | 355/326 |
| 5,300,620 A | * | 4/1994 | Okikawa et al. | 528/172 |
| 5,346,982 A | * | 9/1994 | Tamai et al. | 528/183 |
| 5,356,741 A | * | 10/1994 | Carmichael et al. | 430/56 |
| 5,487,707 A | | 1/1996 | Sharf et al. | 474/253 |
| 5,514,436 A | | 5/1996 | Schlueter, Jr. et al. | 428/57 |
| 5,549,193 A | | 8/1996 | Schlueter, Jr. et al. | 198/844.2 |
| 5,849,399 A | * | 12/1998 | Law et al. | 428/212 |
| 5,942,301 A | | 8/1999 | Schlueter, Jr. et al. | 428/58 |
| 5,997,974 A | * | 12/1999 | Schlueter, Jr. et al. | 428/58 |

\* cited by examiner

Primary Examiner—Sam Chuan Yao
(74) Attorney, Agent, or Firm—Annette L. Bade

(57) ABSTRACT

A process for providing a seamed flexible polyimide component by providing a poly(amic acid) at the seam between interlocking mutually mating seam elements, and curing the seam, thereby converting the poly(amic acid) into a polyimide adhesive at the seam.

25 Claims, 8 Drawing Sheets

PROCESS FOR SEAMING INTERLOCKING SEAMS OF POLYIMIDE COMPONENT USING POLYIMIDE ADHESIVE

CROSS REFERENCE TO RELATED APPLICATIONS

Attention is directed to U.S. Pat. No. 5,1487,707 (D/94226), entitled, "Puzzle Cut Seamed Belt with Bonding Between Adjacent Surfaces by UV Cured Adhesive;" U.S. Pat. No. 5,514,436 (D/94226), entitled, "Endless Puzzle Cut Seamed Belt;" U.S. patent application Ser. No. 08/297,203 (D/94227), entitled "Puzzle Cut Seamed Belt with Bonding Between Adjacent Surfaces:" U.S. patent application Ser. No. 08/522,622 (D/93563) entitled "Puzzle Cut Seamed Belt with Strength Enhancing Strip," now continuing U.S. patent application Ser. No. 08/522,622 (D/935630C), filed Aug. 31, 1995; U.S. patent application Ser. No. 08/004,636 (D/97525) entitled "Process and Apparatus for Producing an Endless Seamed Belt;" U.S. patent application Ser. No. 09/493,445 (D/97525D), filed Jan. 28, 2000, entitled "Process and Apparatus for Producing an Endless Seamed Belt;" U.S. patent application Ser. No. 09/470,931 (D/99698), tiled Dec. 22, 1999, entitled, "Continuous Process for Manufacturing Imagable Seamed Belts for Printers;" U.S patent application Ser. No. 09/615,426, (D/99598), filed Jul. 13, 2000, entitled, "Polyimide Adhesive For Polyimide Component Interlocking Seams;" and U.S. patent application Ser. No. 09/088,011, (D/97683), filed May 28, 1998, entitled, "Unsaturated Carbonate Adhesives for Component Seams." The disclosures of each of these references are hereby incorporated by reference in their entirety.

BACKGROUND OF THE INVENTION

The present invention is directed to a process for seaming interlocking seams of an endless flexible seamed component, in order to provide a belt, film or sheet component wherein an image can be transferred at the seam of the component with little or no print defects caused by the seam. In embodiments, the present invention relates to processes for producing xerographic component imagable polyimide seamed belts comprising an adhesive formed between mutually mating elements of a seam, wherein the adhesive comprises a polyimide material. The present invention, in embodiments, provides a component in which the seam has compatible electrical and release properties with the rest of the component. The present invention further provides, in embodiments, a component having a seam with increased strength. The present invention, in embodiments, also provides a component having a seam in which the height differential between the seam and the rest of the component is virtually nil. The component, in embodiments, allows for image transfer at the seam, which cannot be accomplished with known seamed components.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

The developed toner image recorded on the imaging member is transferred to an image receiving substrate such as paper via a transfer member. The toner particles may be transferred by heat and/or pressure to a transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member under heat and/or pressure.

Transfer members enable high throughput at modest process speeds. In four-color photocopier or printer systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing and photocopy machines in which the toner image is transferred from the transfer member to the image receiving substrate, it is desired that the transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the transfer member.

Thus, it is desirable that the transfer member surface has excellent release characteristics with respect to the toner particles. Conventional materials known in the art for use as transfer members often possess the strength, conformability and electrical conductivity necessary for use as transfer members, but can suffer from poor toner release characteristics, especially with respect to higher gloss image receiving substrates.

Polyimide substrate transfer members are suitable for high performance applications because of their outstanding mechanical strength and thermal stability, in addition to their good resistance to a wide range of chemicals. However, the high cost of manufacturing unseamed polyimide transfer members has led to the introduction of a seamed belt. Belt, as used herein, will refer to belts, films, sheets and the like members. Even polyimides with the best mechanical and chemical properties often exhibit poor adhesion at the seam even when commercially available primers are used.

In the electrostatic transfer applications, use of a seamed transfer polyimide member results in insufficient transfer in that the developed image occurring on the seam is not adequately transferred. This incomplete transfer is partially the result of the difference in seam height to the rest of the belt. A "bump" is formed at the seam, thereby hindering transfer and mechanical performance. The development of puzzle cut seams has increased the quality of transfer somewhat, by decreasing the seam height, thereby allowing smooth cycling. However, even with the improvements made with puzzle cut seams, quality imaging in the seamed area has not been obtainable due to contrast in transfer caused by differences in electrical and release properties of known seaming adhesives. Further, current adhesives do not provide sufficient bonding strength at the seam, resulting in short belt life.

Currently, puzzle cut seam adhesives consist of uv-curable epoxies and hot-melt adhesives. While these adhesives exhibit acceptable strengths at room temperature under tensile load, most undergo premature failure at elevated temperatures. Additionally, the existing adhesives have been found to perform poorly under some important dynamic test conditions.

Therefore, it is desired to provide a more robust adhesive system useful to seam puzzle cut seamed polyimide belts. It is further desirable to provide an adhesive system that allows the seam to have thermal and mechanical characteristics closely matching those of the robust polyimide substrate. Further, it is desired to provide an adhesive having electrical, mechanical and toner release characteristics that closely match those of the substrates. In addition, it is desirable to provide a seam that is imagable, thereby reducing or eliminating the presence of print or copy defects.

U.S. Pat. No. 5,549,193 relates to an endless flexible seamed belt comprising puzzle cut members, wherein at least one receptacle has a substantial depth in a portion of the belt material at the belt ends.

SUMMARY OF THE INVENTION

Embodiments of the present invention include: a process for producing an imagable seam in a polyimide component, wherein the component comprises a seam having a first end and a second end, each of the first end and the second end comprising a plurality of mutually mating elements which join in an interlocking relationship to form a seam, the belt comprising a polyimide substrate, the process comprising: a) providing a poly(amic acid) material between said mutually mating elements; and b) curing said poly(amic acid) material while present between said mutually mating elements to form a polyimide seam.

In addition, embodiments of the present invention include: a process for producing an imagable seam in a polyimide component, wherein the component comprises a seam having a first end and a second end, each of the first end and the second end comprising a plurality of mutually mating elements which join in an interlocking relationship to form a seam, the belt comprising a polyimide substrate, the process comprising: a) treating the mutually mating elements with a basic material; b) treating the mutually mating elements with an acid material; c) providing a poly(amic acid) material between the mutually mating elements; and d) curing the poly(amic acid) material while present between the mutually mating elements to form a polyimide seam.

Embodiments further include: a process for producing an imagable seam in a polyimide component, wherein the component comprises a seam having a first end and a second end, each of the first end and the second end comprising a plurality of mutually mating elements which join in an interlocking relationship to form a seam, the belt comprising a polyimide substrate, the process comprising: a) treating the mutually mating elements with a basic material; b) rinsing the mutually mating elements; c) treating the mutually mating elements with an acid material; d) rinsing the mutually mating elements; e) providing a poly(amic acid) material between the mutually mating elements; and f) curing the poly(amic acid) material while present between the mutually mating elements to form a polyimide seam.

BRIEF DESCRIPTION OF THE DRAWINGS

For a better understanding of the present invention, reference may be had to the accompanying figures.

DETAILED DESCRIPTION OF THE PRESENT INVENTION

The present invention relates to a process for providing an endless flexible seamed polyimide component having an interlocking seam, wherein the seam comprises a polyimide adhesive. The polyimide adhesive provides a seam, in embodiments, which is imagable and wherein the occurrence of copy and print defects at the seam is reduced or eliminated. The present invention further provides a polyimide component wherein the seam and component material share electrical, mechanical and toner release characteristics. The present invention further provides, in embodiments, a component having virtual uniform thickness at the seam. The present invention, in embodiments, provides a seamed component having enhanced bonding strength at the seam.

In preferred embodiments, the component is an intermediate transfer belt, sheet, roller, or film useful in xerographic, including digital, apparatuses. Use of the term "belt" herein refers to belts, sheets, or film components. The polyimide belts herein having a seam comprising a polyimide adhesive, can be useful as belts, sheets, films, rollers, drelts, and the like, for many different processes and components such as photoreceptors, fusing members, transfix members, bias transfer members, bias charging members, developer members, image bearing members, conveyor members, cleaning members, and other members for contact electrostatic printing applications, xerographic applications, including digital, and the like. Further, the belts, herein, can be used for both liquid and powder xerographic architectures.

Figure 1:
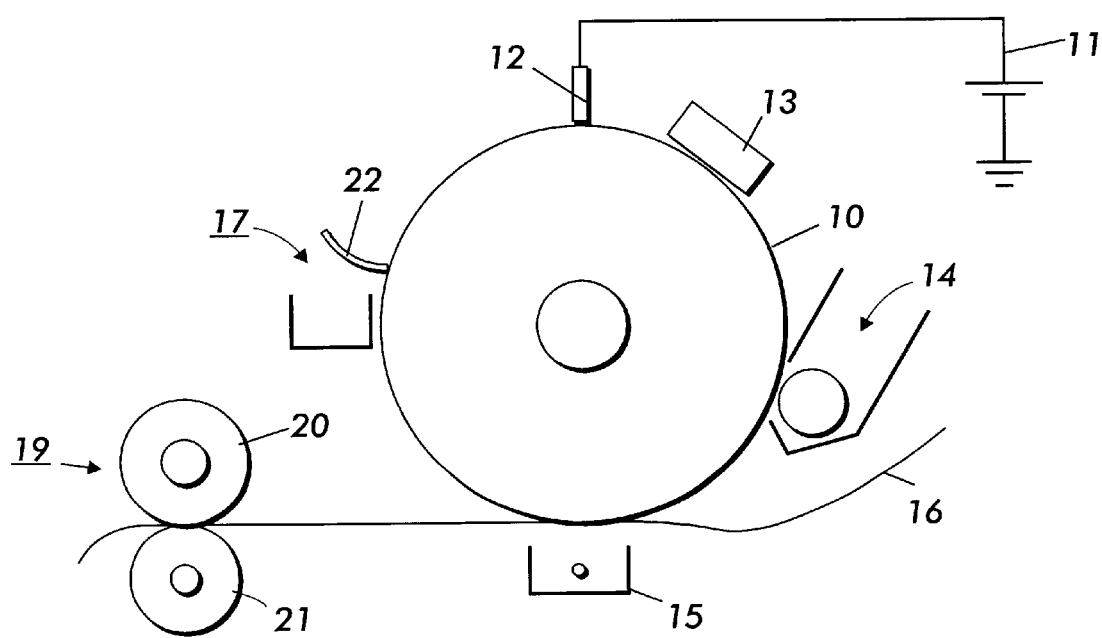
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Preferably, the developed image can be transferred to an intermediate transfer to member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
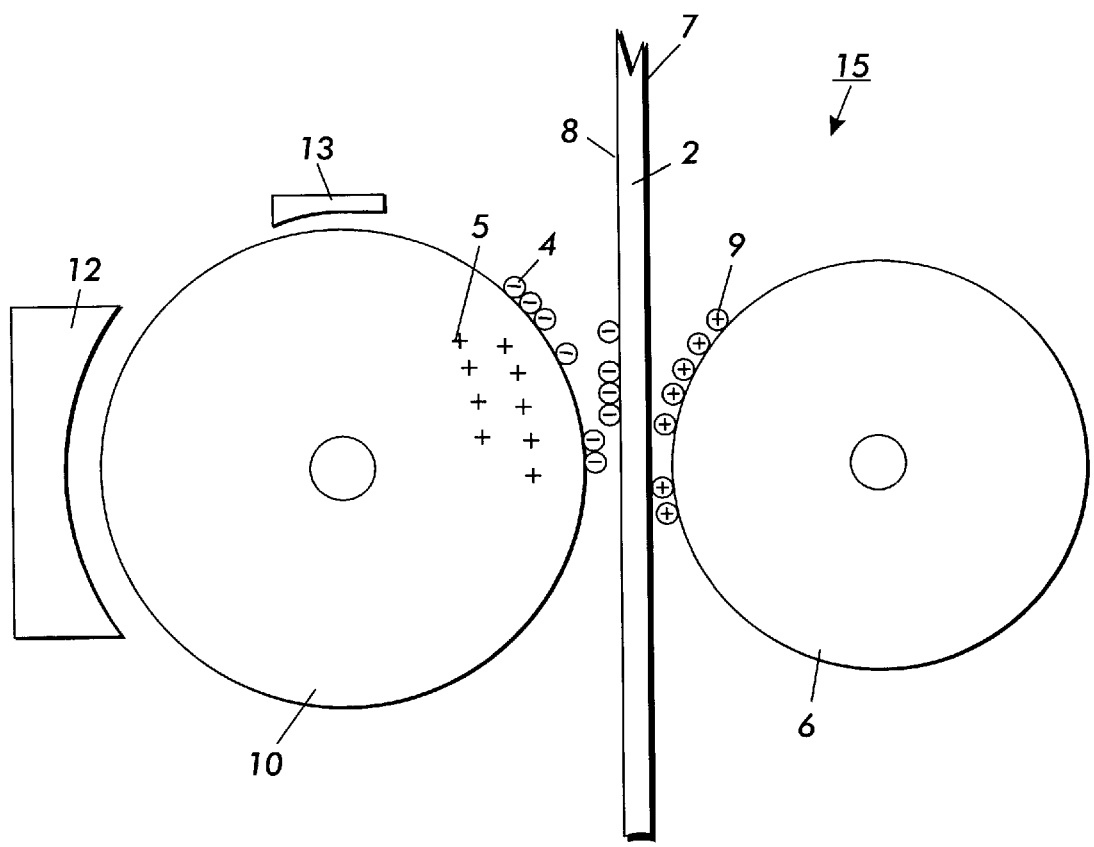
FIG. 2 is an enlargement of a transfer system according to an embodiment of the present invention.

FIG. 2 is a schematic view of an image development system containing an intermediate transfer member. FIG. 2 demonstrates another embodiment of the present invention and depicts a transfer apparatus 15 comprising a transfer member 1 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. In a preferred embodiment of the invention, the multi-image system is a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2. In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor has been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used. In a preferred embodiment, the toner is present in a liquid developer. However, the present invention, in embodiments, is useful for dry development systems also.

A biased transfer roller 6 positioned opposite the photoreceptor drum 10 has a higher voltage than the surface of the photoreceptor drum 10. As shown in FIG. 2, biased transfer roller 6 charges the backside 7 of transfer member 2 with a positive charge. In an alternative embodiment of the invention, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
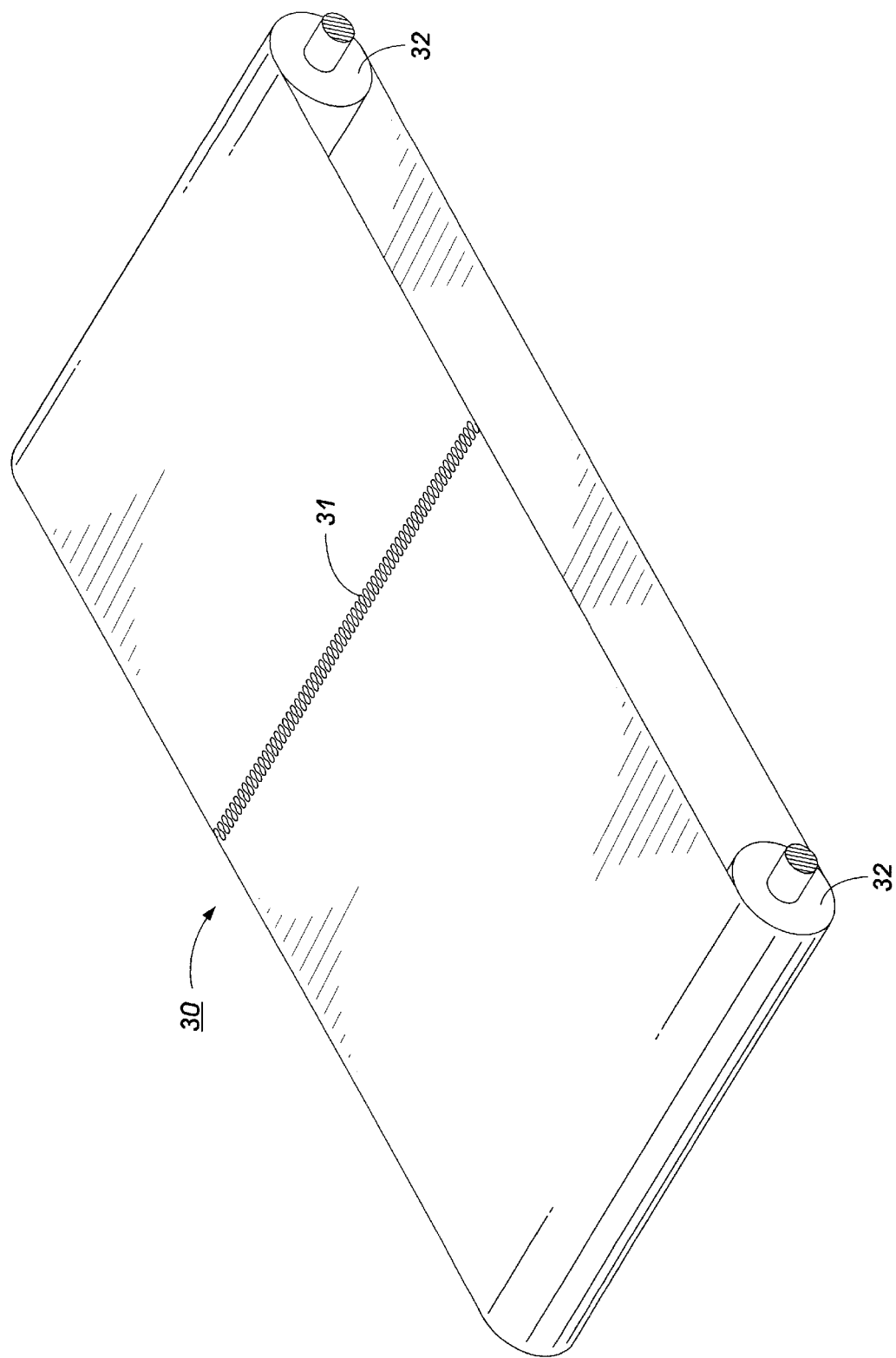
FIG. 3 is an enhanced view of an embodiment of a belt configuration and seam according to the present invention.

FIG. 3 demonstrates an example of an embodiment of a belt in accordance with the present invention. Belt 30 is demonstrated with seam 31. Seam 31 is pictured as an example of one embodiment of a puzzle cut seam. The belt is held in position and turned by use of rollers 32. Note that the mechanical interlocking relationship of the seam 31 is present in a two-dimensional plane when the belt 30 is on a flat surface, whether it be horizontal or vertical. While the seam is illustrated in FIG. 3 as being perpendicular to the two parallel sides of the belt, it should be understood that it may be angled or slanted with respect to the parallel sides. This enables any noise generated in the system to be distributed more uniformly and the forces placed on each mating element or node to be reduced.

The seam formed according to the present invention is one having a thin and smooth profile, of enhanced strength, improved flexibility and extended mechanical life. In a preferred embodiment, the belt ends are held together by the geometric relationship between the ends of the belt material, which are fastened together by a puzzle cut. The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In the present invention, the seam including the puzzle cut members, is held together by a polyimide adhesive, which is compatible with the rest of the belt. The belt, in embodiments, provides improved seam quality and smoothness with substantially no thickness differential between the seam and the adjacent portions of the belt.

Figure 4:
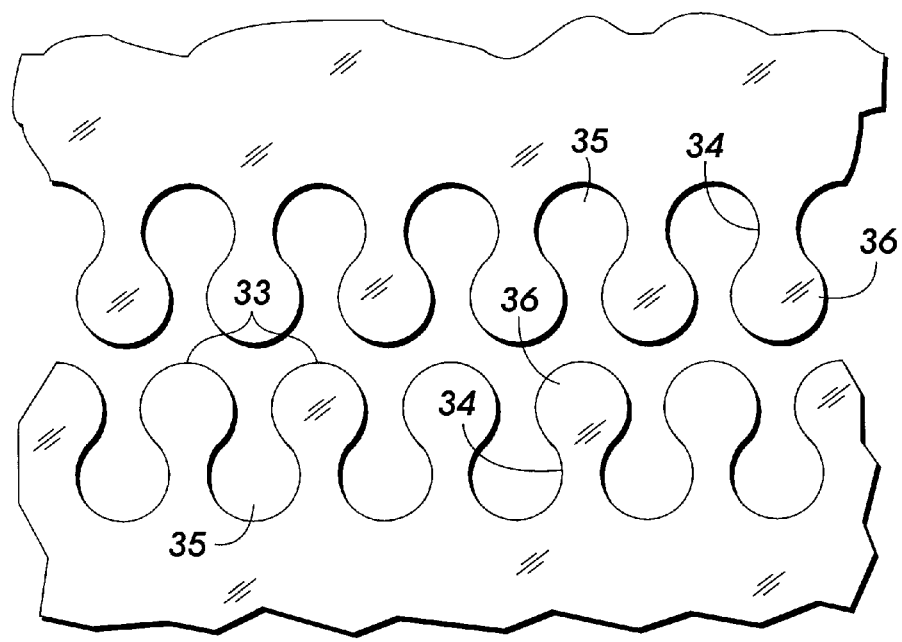
FIG. 4 is an enlargement of a puzzle cut seam having a head and neck members according to one embodiment of the present invention.
Figure 5:
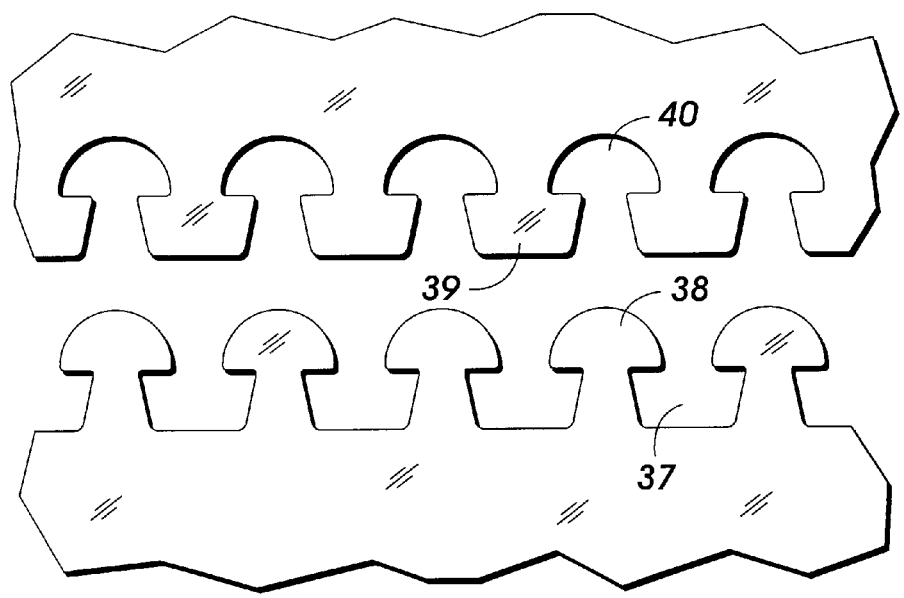
FIG. 5 is an enlargement of a puzzle cut seam having mushroom-shaped puzzle cut members according to another embodiment of the present invention.
Figure 6:
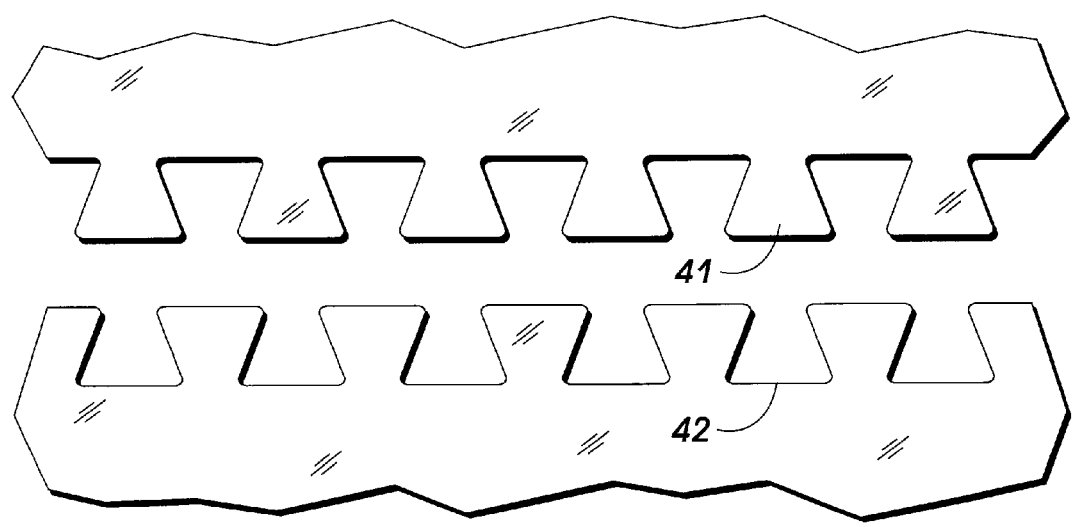
FIG. 6 is an enlargement of a puzzle cut seam having dovetail members according to another embodiment of the present invention.
Figure 7:
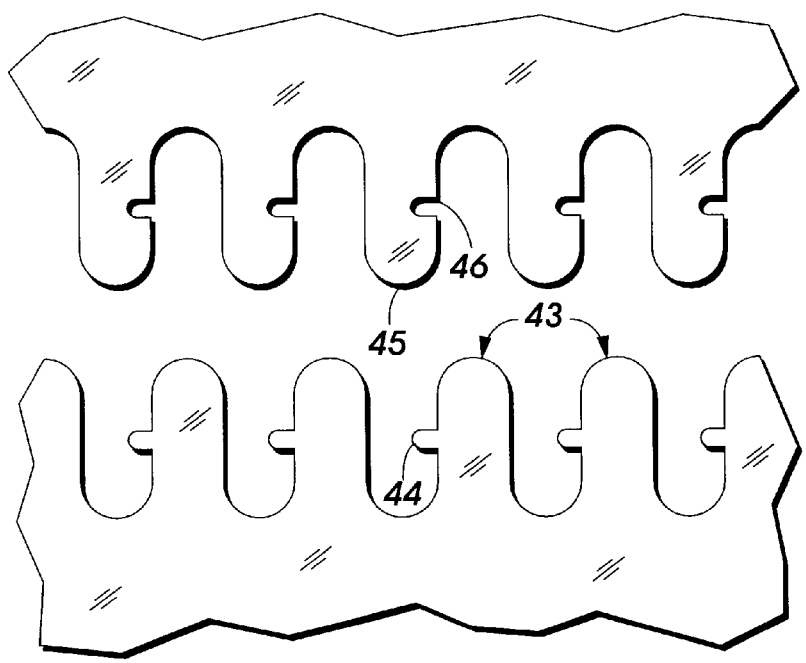
FIG. 7 is an enlargement of a puzzle cut seam having recessor and teeth members according to another embodiment of the present invention.

An example of an embodiment of a puzzle cut seam having two ends, each of the ends comprising puzzle cut members or mutually mating elements is shown in FIG. 4. The puzzle cut pattern may take virtually any form, including that of nodes such as identical post or neck 34 and head 33 or node patterns having projections 36 and receptacles 35 which interlock when brought together as illustrated in FIG. 4. The puzzle cut pattern may also be of a more mushroom-like shaped pattern having first projections 38 and 39 and second receptacles 40 and 37 as illustrated in FIG. 5, as well as a dovetail pattern as illustrated in FIG. 5 having first projections 41 and second receptacles 42. The puzzle cut pattern illustrated in FIG. 7 has a plurality of first fingers 43 with interlocking teeth 44 and plurality of second fingers 45 which have recesses 46 to interlock with the teeth 44 when assembled. It is preferred that the interlocking elements all have curved mating elements to reduce the stress concentration between the interlocking elements and permit them to separate when traveling around curved members such as the rolls 32 of FIG. 3. It has been found that with curved mating elements that the stress concentration is lower than with square corners where rather than the stress being uniformly distributed it is concentrated leading to possible failure.

Figure 8:
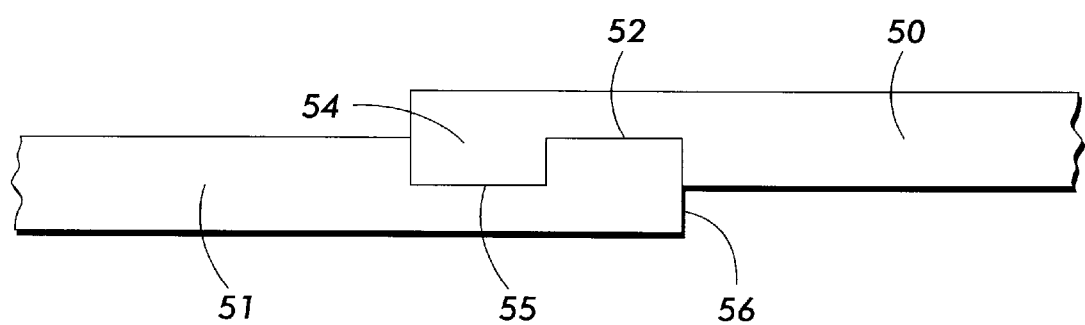
FIG. 8 is an enlargement of a puzzle cut seam having receptacle and projection members of differing depth according to another embodiment of the present invention.

Another example of a puzzle cut seam is shown in FIG. 8 in which the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt as the belt ends.

It is preferred that the height differential between the seam and the rest of the belt (the nonseamed portions of the belt) be practically nil, or from about 0 to about 25 micrometers, preferably from about 0.0001 to about 25 micrometers, and particularly preferred of from about 0.01 to about 15 micrometers.

Figure 9:
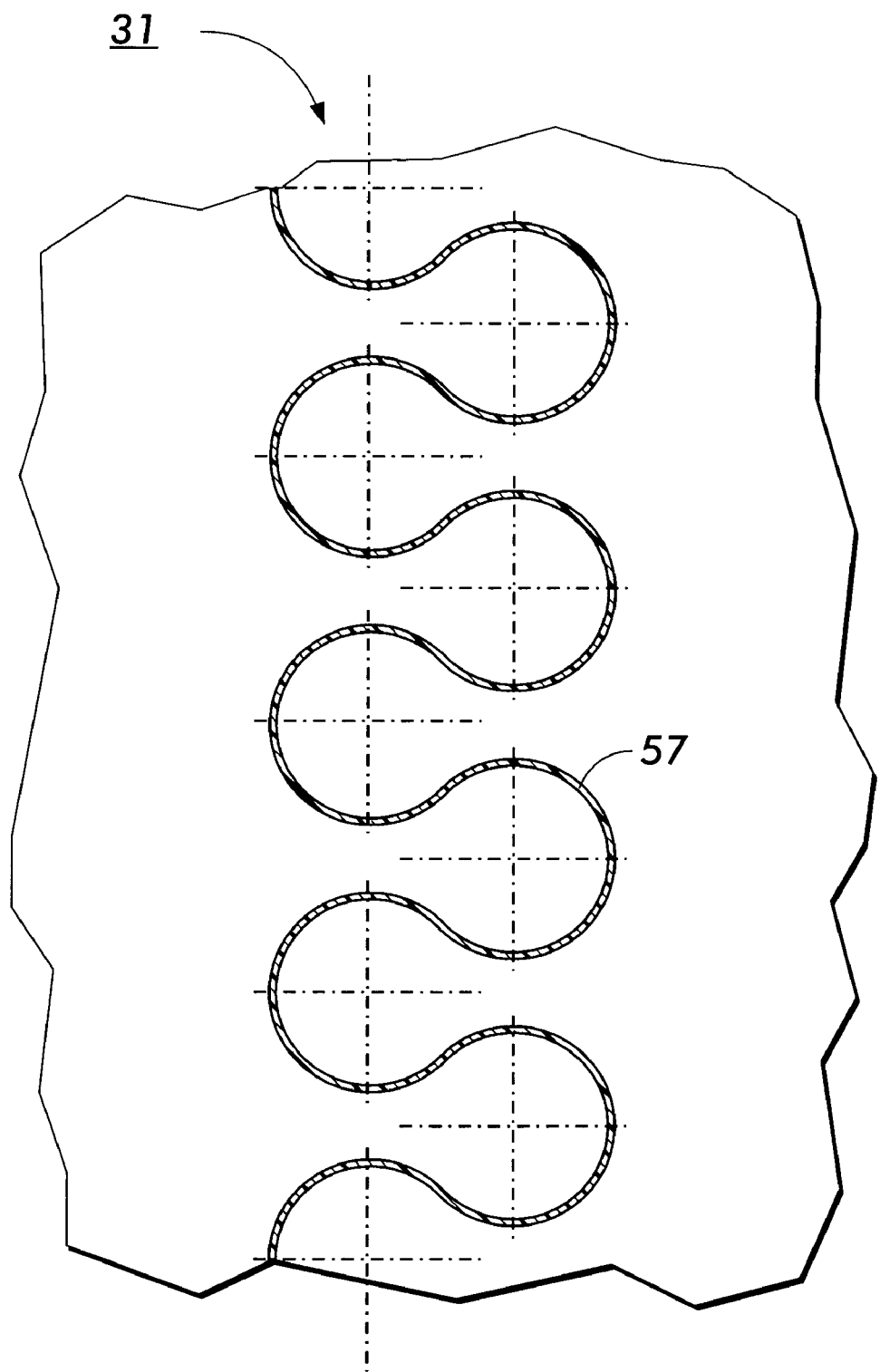
FIG. 9 is an enlarged version of a belt according to one embodiment of the present invention and demonstrates a crevice between the puzzle cut members, the crevice containing an adhesive.

An adhesive is preferably present between the seam, and placed in the crevice between the puzzle cut members to a thickness of from about 0.0001 about 25 micrometers. As shown in one embodiment of a puzzle cut seam 31 according to the present invention, the adhesive is present between the puzzle cut members and at the seam crevice 57 of FIG. 9.

The adhesive is preferably chosen to have a resistivity within the range desired for electrostatic transfer of toner. Preferably, the resistivity of the seam is the same or similar to that of the belt in order to provide the same electrical properties for the seam and the rest of the belt. A preferred surface resistivity range for toner transfer performance is from about $10^5$ to about $10^{15}$ ohms/sq, preferably from about $10^7$ to about $10^{14}$ ohms/sq, and particularly preferred from about $10^8$ to about $10^{11}$ ohms/sq. A preferred volume resistivity is from about $10^8$ to about $10^{13}$ ohm-cm. When the belt and the seam of the belt have a same or substantially the same electrical resistance, the toner transfer at the seam is the same or substantially the same as the transfer of the belt. Such transfer at the seam provides an invisible or substantially invisible seam.

The electrical properties can be controlled by varying the amount of fillers, by changing the type of filler added, and/or by changing the curing procedure.

A preferred adhesive for use with a belt seam, preferably a puzzle cut belt seam, is a polyimide adhesive, and in preferred embodiments, a semiconductive polyimide adhesive.

Preferred adhesives include polyimides which can be electrically controlled by the addition of conductive fillers. Examples include conductive polymer filled polyimides such as polyaniline polyimide, and the like. More specific examples include PYRALIN® from DuPont, Larc TPI or Larc-SI® from IMITEC, XU218® (low temperature polyimide) from Ciba-Geigy, and the like.

It is preferred to add fillers to the polyimide substrate and/or to the adhesive so as to impart desired electrical resistivity. Examples of suitable fillers for use herein include carbon fillers, metal oxide fillers, doped metal oxide fillers, other metal fillers, ionic conductive fillers such as ionic salts, other conductive fillers, and the like. Specific examples of fillers include carbon fillers such as carbon black, fluorinated carbon black, graphite, low conductive carbon, and the like, and mixtures thereof; metal oxides such as indium tin oxide, zinc oxide, iron oxide, aluminum oxide, copper oxide, lead oxide, and the like, and mixtures thereof; doped metal oxides such as antimony-doped tin oxide, antimony-doped titanium dioxide, aluminum-doped zinc oxide, similar doped metal oxides, and mixtures thereof; and polymer particles such as polytetrafluoroethylene, polypyrrole, polyannaline, doped polyanaline and the like, and mixtures thereof. Preferred commercially available fillers include fluorinated carbon (such as ACCUFLUOR® from Advance Research Chemicals, Inc. of Catoosa, Okla., ZELEC® (antimony doped tin oxide) available from DuPont in Wilmington, Del., Baytron® P, Baytron® M (polymer which contain poly-ethylendioxythiophene) from Bayer Corporation, Pittsburgh, Pa.

Preferred fluorinated carbons include those having the formula $CF_x$ with x representing the number of fluorine atoms and generally being up to about 1.5, preferably from about 0.01 to about 1.5, and particularly preferred from about 0.04 to about 1.4. Other preferred fluorinated carbons are poly(dicarbon monofluoride) which is usually written in the shorthand manner $(C_2F)_n$. Preferred fluorinated carbons selected include those described in U.S. Pat. No. 4,524,119 to Luly et al., the subject matter of which is hereby incorporated by reference in its entirety, and those having the tradename ACCUFLUOR®, (ACCUFLUOR® is a registered trademark of Allied Signal, Morristown, N.J.) for example, ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUORE® 1000 and ACCUFLUORO® 2065 have 62 and 65 percent by weight fluorine, respectively, based on the weight of fluorinated carbon. Also, ACCUFLUORO® 1000 comprises carbon coke, whereas ACCUFLUOR® 2065, 2028 and 2010 all comprise conductive carbon black. These fluorinated carbons are of the formula $CF_x$, and are formed by the reaction of $C+F_2=CF_x$.

Preferably, the filler, if present in the substrate, is present in an amount of from about 1 to about 60, and preferably from about 3 to about 40 percent by weight of total solids. Total solids, as used herein, refers to the amount of solids present in the substrate, layer, or adhesive. The filler, if present in the adhesive, is preferably present in an amount of from about 5 to about 40, and preferably from about 7 to about 40 percent by weight of total solids.

Commercially available filled polyimides useful as adhesives herein include PYRALIN from DuPont, Larc-TPI® or Larc-SI from IMITEC, Schenectady, N.Y., XU218® (low temperature polyimide from Ceiba-Geigy), KERIMIDE 8292 (low temperature laminating adhesive from Ceiba-Geigy of Brewster, N.Y.).

Generally, in the process for producing the seamed belt, a poly(amic acid) is provided in the seamed area, and then converted into a polyimide while present in the seam. Conversion of the poly(amic acid) to a polyimide is possible within the seam region by use of curing methods, and preferably heat curing.

In a preferred embodiment, the seamed area is chemically modified prior to addition of the poly(amic acid). Preferably, the area to be seamed is treated with a basic material, preferably an aqueous base. Examples of suitable aqueous bases include KOH, Ca(OH)$_2$, NaOH, NH$_4$OH, NR$_4$OH (where R=CH$_4$ or CH$_4$CH$_4$), and the like. Preferably, the area to be seamed is dipped in the base material for about 1 to about 30 minutes, and preferably about 15 minutes. The treatment with a basic material of the polyimide substrate area to be seamed, converts the imide functionalities at the surface to polyamate salts of the base. Preferably, the area to be seamed is rinsed subsequent to treatment with the base. Rinsing can be performed by known methods such as rinsing with deionized water, followed by rinsing with isopropyl alcohol, acetone, methyl ethyl ketone, or the like.

It is preferred to treat the area to be seamed with an acid material subsequent to treatment with a base. Preferably, the area to be seamed is dipped in the acid material for about for about 1 to about 30 minutes, preferably 15 minutes. Examples of suitable acids include HCl, CH$_3$COOH and the like. It is preferred to rinse the area subsequent to treatment with the acid. Rinsing can be performed as set forth above, such as by use of deionized water, or the like, and mixtures thereof. The treatment of the area to be seamed with an acid solution generates amic acid functionalities at the surface of the area to be seamed.

In preferred embodiments, subsequent to treatment with a base and an acid, the poly(amic acid) adhesive can then be deposited to the modified surface. Preferably, the adhesive is deposited while in solution form diluted with an appropriate solvent. Examples of suitable solvents include include N-methylpyrrolidinone (NMP), N,N-dimethylacetamide (DMAc), N,N-dimethylformamide (DMF), tetramethylurea (TMU), dimethylsulfoxide (DMSO), and the like, and mixtures thereof.

Curing follows deposition of the poly(amic acid) to the area to be seamed. Chemical and mechanical interlocking due to the interdiffusion of the poly(amic acid) at the seam to the polyimide occurs. This interlocking results in very strong adhesion at the interface of the seam. Once converted to the polyimide via thermal treatment of the precursor, the resulting seam exhibits similar physical characteristics to the rest of the belt.

Preferably, the semiconductive polyimide adhesive can be prepared by mixing a poly(amic acid) optionally with a conductive filler, placing the adhesive in the seam region, and curing the seam. Upon curing the seam, the poly(amic acid) will convert to the desired polyimide, thereby forming the invisible, or virtually invisible seam. The result provides a virtual imagable seam with little or no loss of print quality.

The adhesive solution may be applied by any suitable means such as using a cotton tipped applicator, spraying, dipping, use of a liquid dispenser or glue gun, or like known means.

The seam can then be cured by various methods. Curing procedures useful in curing the seam include infrared or thermal curing. Examples of heat curing include use of moderate heat once the adhesive is placed in the seam crevice. This moderate heating also increases the crosslinking/solidification reaction and increases the seam processing and belt fabrication speed. Desired temperature includes from about 40 to about 250° C., preferably from about 100 to about 200° C., at a time of from about 30 seconds to about 10 hours, preferably from about 30 minutes to about 5 hours, and particularly preferred, about 1 hour. Heat may be applied by, for example, a heat gun, oven, or other suitable means.

By applying the adhesive to the seam and forming the virtual seam as indicated, a cost savings of at least 5 times the cost of a coated seam results.

Preferred polyimide substrates include polyanaline polyimide composite. Commercially available polyimide substrates include KAPTON® from DuPont, UPILEX® from DuPont, ULTEM® from General Electric and the like.

Figure 10:
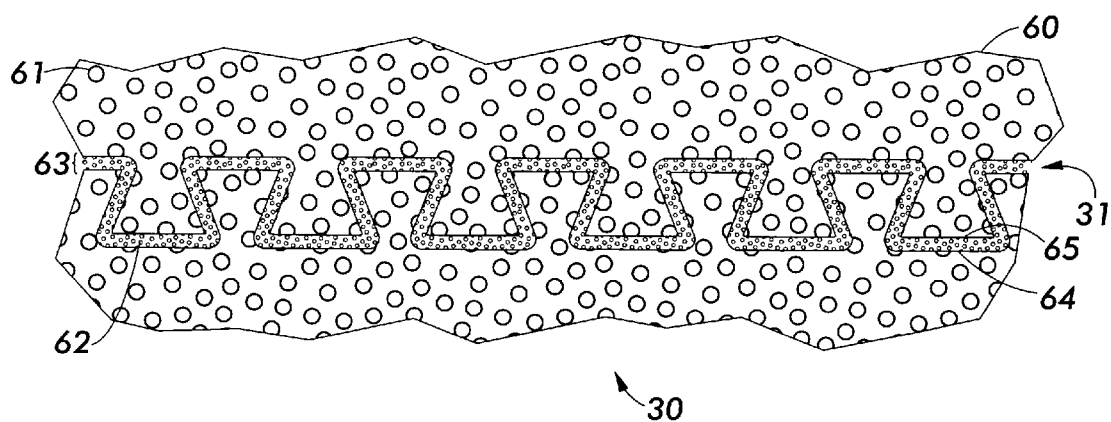
FIG. 10 is an enlarged cross-sectional view of a belt according to a preferred embodiment of the invention.

An example of a preferred polyimide belt used in combination with the polyimide adhesive is depicted in FIG. 10. The belt 30 comprises a polyimide substrate 60, having therein, in preferred embodiments, conductive fillers 61. The belt contains seam 31 having an adhesive 63 positioned between the seam members 64 and 65. In a preferred embodiment, conductive fillers 62 are dispersed or contained in the polyimide adhesive. Conductive fillers 61 dispersed or contained in the polyimide substrate may be the same or different to those fillers 62 contained or dispersed in the polyimide adhesive.

The polyimide adhesive provides an excellent seam adhesive for polyimide belts, and in preferred embodiments, intermediate transfer belts. The semiconductive polyimide adhesives, in embodiments, have the same or similar mechanical and surface release properties as the substrates. Further, the polyimide adhesives, in embodiments, provide good bonding strength to the substrate seam members. The resistivity of the adhesives can be tuned into the same range as the substrate by changing the loading level of the conductive filler, by mixing different ratios of the conductive fillers, or by varying curing conditions. Applying the adhesive to the seam provides a simpler and cost efficient method of seaming as compared to preparing a seam using an overcoating technique. The cost savings is about 5 times.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of Intermediate Transfer Belt

A polyimide intermediate transfer material was obtained from DuPont. A belt was formed from this DuPont material which comprised polyaniline-doped polyimide. The resistivity was tested and found to be from about $10^{12}$ to about $10^{13}$ ohm/sq.

Example 2

Preparation of Fluorinated Carbon Filled Poly(amic acid) Adhesive Seam

About 0.16 grams of ACCUFLUOR® 2028 (fluorinated carbon from Advanced Research Chemical, Inc.) was mixed into about 2 grams PYRALIN® (a poly(amic acid) in NMP (1-methyl 2-pyrrolidinone, a solvent with about 20% solids) obtained from DuPont. The resulting dispersion was mixed into about 10 grams of PYRALIN® and blended for about 1.5 hours.

The resulting poly(amic acid) adhesive solution was applied along a chemically modified polyimide seam of the intermediate transfer belt of Example 1. The seam was modified as follows. The seam was dipped with 1M KOH solution for about 15 minutes at ambient temperature, followed by rinsing with deionized water. The seam area was then dipped in 0.5 N HCl at ambient temperature for about 15 minutes followed by rinsing with deionized water and isopropyl alcohol, respectively. After drying in a convention oven for about 5 minutes at about 50° C., the fluorinated carbon loaded poly(amic acid) solution was then applied along the seam area using a cotton tipped applicator. Heat was then applied to the seam area, using a heat gun, to enable the drying of the polyimide. The temperature applied was about 100° C. for about 5 minutes. The sample was place in an oven at about 200° C. for about 1 hour to cure the polyimide.

The resulting belt was tested for strength. The belt was placed on a flex tester designed by Xerox and made by SCJ Associates, Inc., Rochester, N.Y. For these tests, a 1 inch roller was used. One flex cycle is equal to 3 multiple cycles (1 revolution). The flex test samples are under a constant load of 838 grams. The results are shown below in Table 1.

TABLE 1

| Polyimide | Failure Load | Flex Cycles |
| --- | --- | --- |
| PYRALIN ® | 250 kgf/cm$^2$ | 5,400,000 |
| LaRC-SI ® | 150 kgf/cm$^2$ | 196,700 |

Example 3

Preparation of Antimony-Doped Tin Oxide Filled Poly(amic acid) Adhesive Seam

About 4.2 grams of ZELEC® (antimony-doped tin oxide from DuPont of Wilmington, Del. was mixed with about 50 grams poly(amic acid) (PYRALIN® from DuPont). The coating mixture was then mixed under a paintshaker for about 30 minutes. Before applying to the seaming area, coating was adjusted by adding NMP (1-methyl-2-pyrrolidinone, a solvent) to the desired viscosity to achieve low seam height and smooth seaming surface. The resulting coating was dried at about 100° C. for about 30 minutes and then cured at about 200° C. for about 60 minutes. The resistivity of the seam was tested and found to be about $10^{12}$ ohm/sq.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A process for producing a seam in a polyimide component, wherein said component comprises a seam having a first end and a second end, each of said first end and said second end comprising a plurality of mutually mating elements which join in an interlocking relationship to form a seam, said component comprising a polyimide substrate, said process comprising:

a) treating said mutually mating elements with a basic material;

b) rinsing said mutually mating elements;

c) treating said mutually mating elements with an acid material;

d) providing a poly(amic acid) material between said mutually mating elements; and e) curing said poly(amic acid) material while present between said mutually mating elements to form a polyimide seam.

2. A process in accordance with claim 1, wherein said curing is heat curing.

3. A process in accordance with claim 2, wherein said heat curing is performed at a temperature of from about 40 to about 250° C.

4. A process in accordance with claim 3, wherein said temperature is from about 100 to about 200° C.

5. A process in accordance with claim 2, wherein said heat curing is accomplished for a time of from about 30 seconds to 10 hours.

6. A process in accordance with claim 5, wherein said heat curing is accomplished for a time of from about 30 minutes to about 5 hours.

7. A process in accordance with claim 1, wherein a conductive filler is added to said poly(amid acid) prior to providing said poly(amic acid) between said mutually mating elements.

8. A process in accordance with claim 7, wherein said conductive filler is selected from the group consisting of carbon fillers, doped metal oxide fillers, ionic salts, and polymer fillers.

9. A process in accordance with claim 7, wherein said carbon filler is selected from the group consisting of carbon black, graphite, and fluorinated carbon.

10. A process in accordance with claim 7, wherein said doped metal oxide is selected from the group consisting of antimony-doped tin oxide, antimony-doped titanium dioxide, and aluminum-doped zinc oxide.

11. A process in accordance with claim 7, wherein said polymer filler is selected from the group consisting of polytetrafluoroethylene, polypyrrole, and polyannaline.

12. A process in accordance with claim 1, wherein said polyimide of said polyimide substrate is polyanaline polyimide.

13. A process in accordance with claim 1, wherein said polyimide substrate comprises a conductive filler.

14. A process in accordance with claim 13, wherein said filler is selected from the group consisting of carbon fillers, doped metal oxide fillers, ionic salts, and polymer fillers.

15. A process in accordance with claim 14, wherein said carbon filler is selected from the group consisting of carbon black, graphite, and fluorinated carbon.

16. A process in accordance with claim 14, wherein said doped metal oxide is selected from the group consisting of antimony-doped tin oxide, antimony-doped titanium dioxide, and aluminum-doped zinc oxide.

17. A process in accordance with claim 14, wherein said polymer filler is selected from the group consisting of polytetrafluoroethylene, polypyrrole, and polyannaline.

18. A process in accordance with claim 1, wherein said component is an intermediate transfer component.

19. A process in accordance with claim 1, wherein said plurality of mutually mating elements are in the form of a puzzle cut pattern.

20. A process in accordance with claim 19, wherein said mutually mating elements comprise a first projection and a second receptacle geometrically oriented so that said second receptacle on the first end receives the first projection on the second end and wherein said first projection on said first end is received by said second receptacle on the second end to form a joint between the first and second ends.

21. A process in accordance with claim 1, wherein prior to adding said poly(amic acid) between said mutually mating elements, said mutually mating elements are treated with a base.

22. A process in accordance with claim 21, wherein subsequent to treatment with a base, said mutually mating elements are subjected to rinsing treatment.

23. A process in accordance with claim 21, wherein subsequent to treatment with a base, said mutually mating elements are treated with an acid.

24. A process in accordance with claim 23, wherein subsequent to treating said mutually mating elements with an acid, said mutually mating elements are subjected to a rinsing treatment.

25. A process for producing a seam in a polyimide component, wherein said component comprises a seam having a first end and a second end, each of said first end and said second end comprising a plurality of mutually mating elements which join in an interlocking relationship to form a seam, said component comprising a polyimide substrate, said process comprising:

a) treating said mutually mating elements with a basic material;

b) rinsing said mutually mating elements;

c) treating said mutually mating elements with an acid material;

d) rinsing said mutually mating elements;

e) providing a poly(amic acid) material between said mutually mating elements; and f) curing said poly(amic acid) material while present between said mutually mating elements to form a polyimide seam.

\* \* \* \* \*